Jan. 23, 1934.   W. F. GROENE   1,944,231
LATHE
Filed June 15, 1932    3 Sheets-Sheet 2
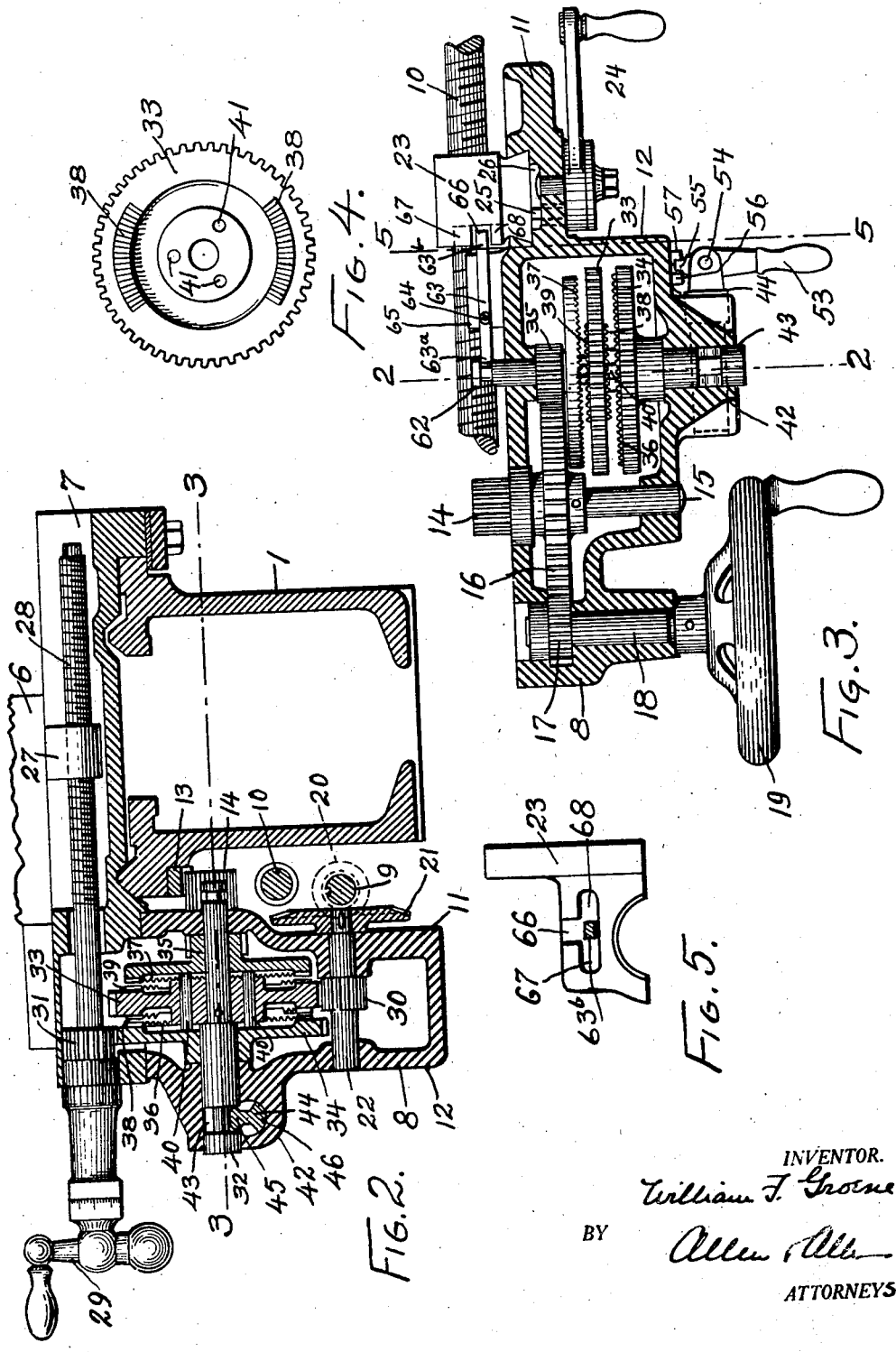
INVENTOR.
William F. Groene
BY
Allen & Allen
ATTORNEYS.

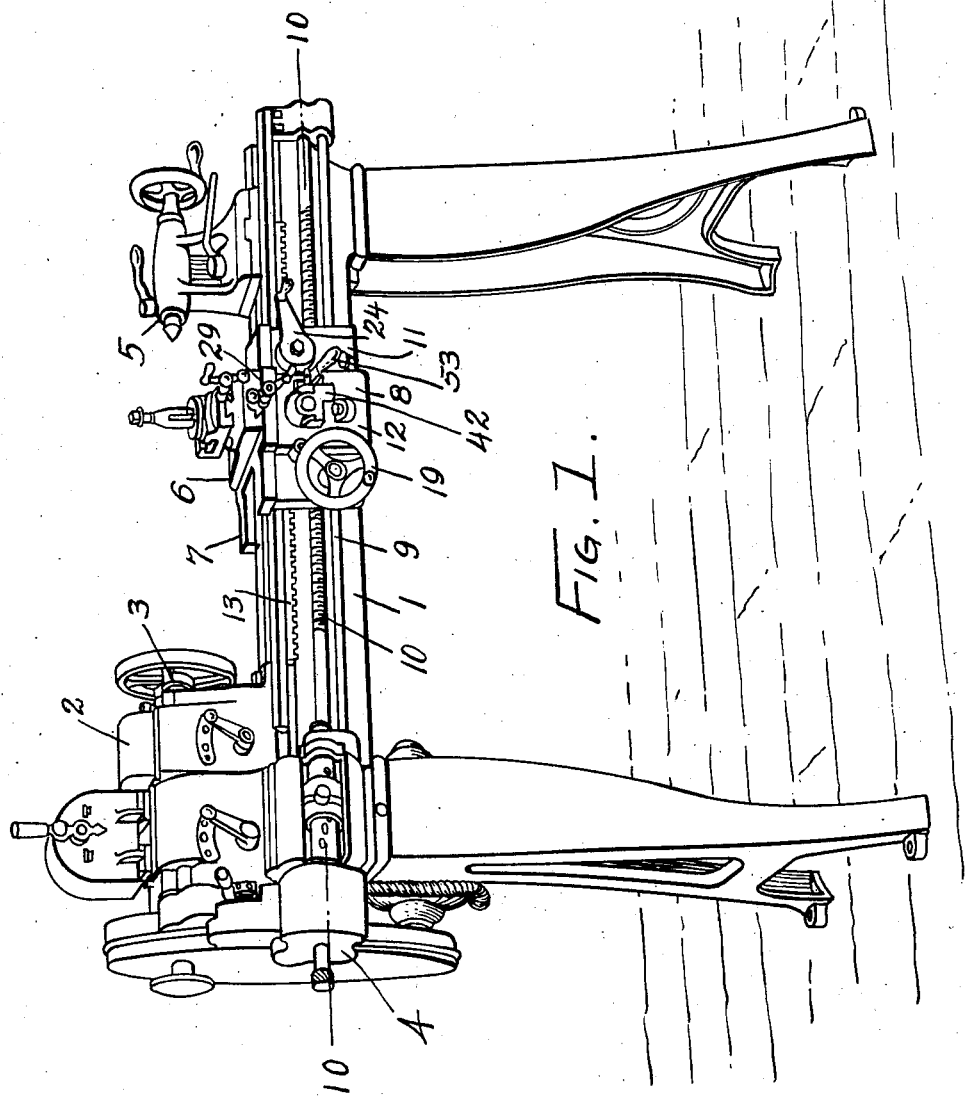

Jan. 23, 1934.  W. F. GROENE  1,944,231
LATHE
Filed June 15, 1932   3 Sheets-Sheet 3
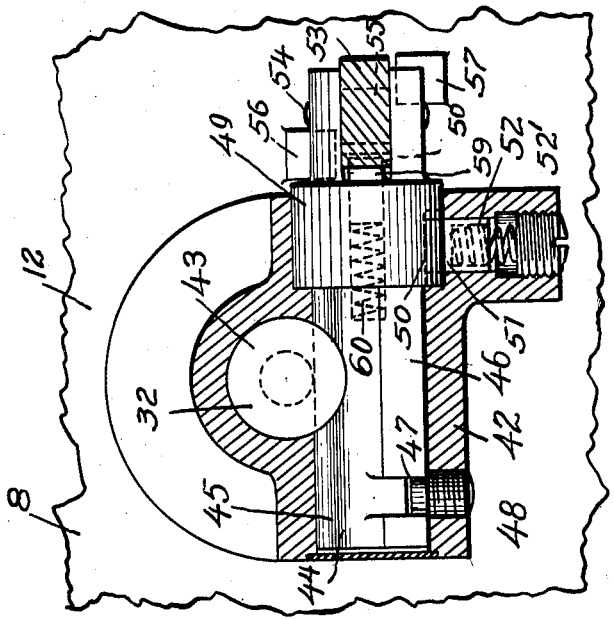
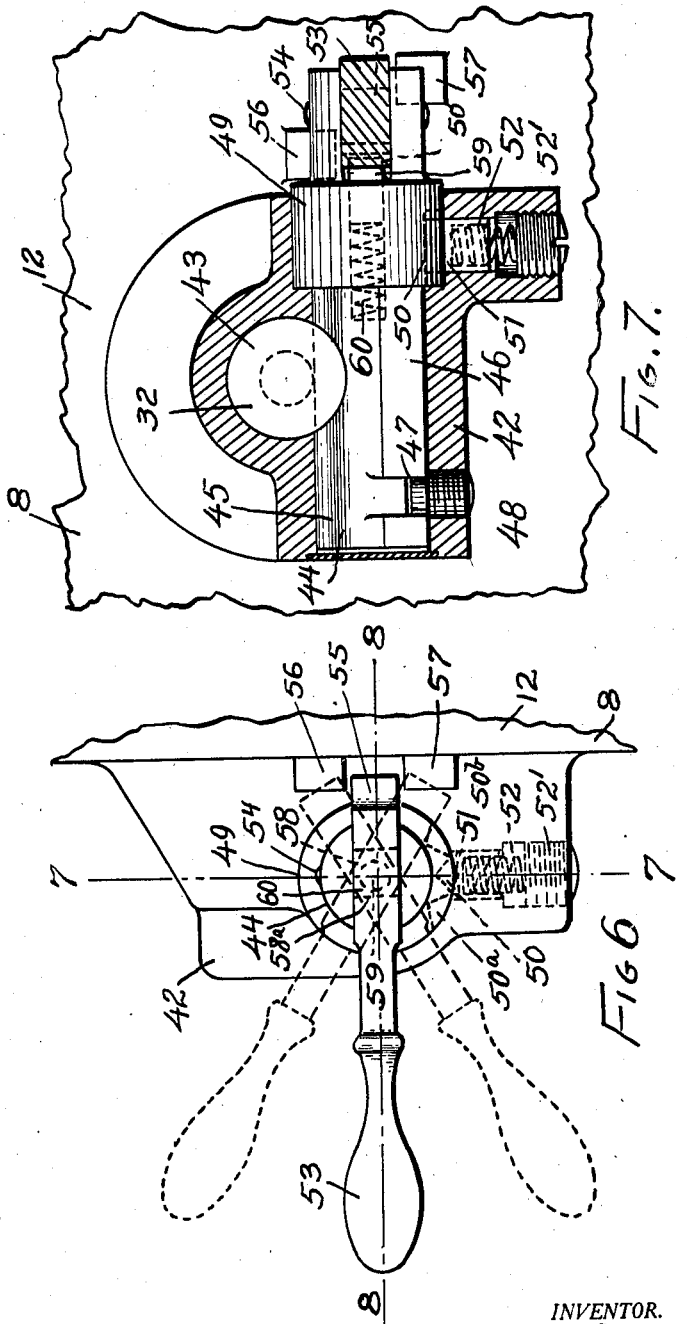
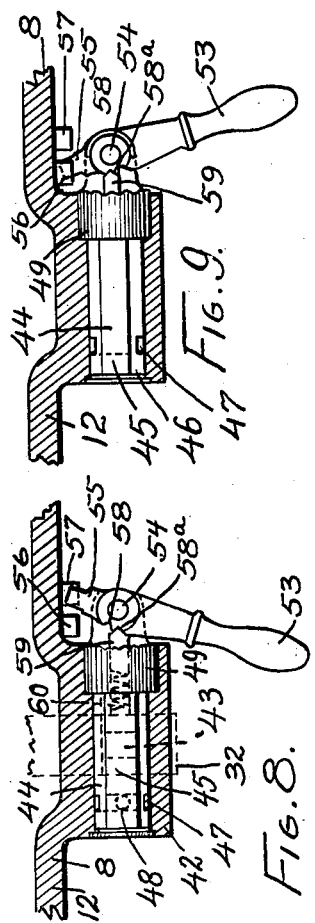
INVENTOR.
William F. Groene
BY
ATTORNEYS.

Patented Jan. 23, 1934

1,944,231

UNITED STATES PATENT OFFICE 1,944,231

LATHE

William F. Groene, Cincinnati, Ohio, assignor to The R. K. Le Blond Machine Tool Company, Cincinnati, Ohio, a corporation of Delaware Application June 15, 1932. Serial No. 617,381

10 Claims. (Cl. 82—22)

My invention relates to machine tools, and more especially to the driving of the tool-feeding mechanisms of lathes. An object of my invention is to provide simple and rugged mechanism for operatively connecting either the cross-feeding mechanism or the axially-feeding mechanism with the driving means of the lathe. A further object is to effect such connection in such manner that it is impossible to connect both mechanisms at the same time. A further object is to insure against connection of either mechanism when the feeding is to be done by other means. A further object is to provide such mechanism for connecting either the cross-feed or the rack feed with the driving means, or connecting the lead screw to the carriage, and providing against connection of any of these unless the other two are disconnected. A further object is to make the operations of changing the connections as convenient as possible.

In my preferred embodiment of my invention having the above objects, I mount in the apron of the lathe carriage three rotary members on a common front-to-rear axis, formed as spur gears, the middle one meshing with a spur gear driven by the feed rod and being slidable to clutch, by means provided on the adjacent sides of the members, either one of the outer members, which are meshed, respectively, with spur gears of the cross feed and the rack feed mechanisms. I also connect with the shiftable middle member means coacting with the movable lead screw connection so as to preclude connection of the lead screw while the middle member clutches either outer member, and permits shifting of the middle member from its neutral unclutched mid position only if the lead screw is disconnected. Also connected to the middle member is suitable means extending to the front of the apron and provided with detent means to hold the middle member in any of its positions, and means for conveniently releasing and moving the member. The above construction will be described in detail, and further objects will appear, in the following description, illustrated by the accompanying drawings, in which—

Figure 1 is a front perspective view of a lathe having the several features of my improvement incorporated in it.

Fig. 2 is a transverse section of the apron and the bed on the line 2—2 of Fig. 3.

Fig. 3 is a horizontal section of the apron on the line 3—3 of Fig. 2.

Fig. 4 is a front elevation of the middle member.

Fig. 5 is a partial transverse section on the line 5—5 of Fig. 3, showing the lead screw nut in elevation.

Fig. 6 is a partial end elevation of the apron, showing the clutch shaft handle device.

Fig. 7 is a longitudinal vertical section of the same on the line 7—7 of Fig. 6.

Figs. 8 and 9 are horizontal sections on the line 8—8 of Fig. 6, on a reduced scale, showing different positions of the shifter handle lever.

The lathe shown in Fig. 1 is of usual construction with the bed 1, head 2 with spindle 3 with which gearing in the housing 4 connects for driving the feed mechanisms; and with the tail stock 5 acting in conjunction with the spindle 3 to support work to be acted upon by a tool carried on the cross slide 6 on the carriage 7 having the apron 8 depending in front of the bed 1 for connection either to the feed rod 9 or the lead screw 10, which are driven by the gearing in the housing 4. This apron as herein shown comprises the back 11 with a casing 12 extending forward therefrom, with its bottom closed and its open top fixed to the under side of the part of the carriage 7 that projects past the front of the lathe bed 1. The feed rod 9 and lead screw 10 therebelow are between the apron and bed, as usual, as also is the rack 13, above the lead screw and fixed to the bed, with the pinion 14 meshing therewith, on the back of the apron, fixed on a shaft 15 together with gear 16 meshing with pinion 17 fixed on shaft 18 with hand wheel 19. Bevel pinion 20 is splined on feed rod 9 and meshes with bevel gear 21 fixed on shaft 22 in apron 8; and nut member 23 is slid on the back of the apron into or out of mesh with lead screw 10 by a handle lever 24 with a projection 25 engaging in a horizontal slot 26 in the front of the nut member 23. The cross slide 6 has a nut 27 in which is threaded the crossfeed screw 28 extending out at the front of the carriage 7 with a handle crank 29. These are all usual constructions in lathes.

The shafts 15 and 22 are journaled parallel with the cross-feed screw 28 in the back 11 and front of the housing 12 of the apron; and the shaft 22 has fixed on it inside the casing 12 a wide-faced pinion 30, while the cross-feed screw 28 has fixed on it the pinion 31, at the front of the open top of the apron casing 12. Also journaled in the apron in a similar manner, parallel with the shafts 15 and 22 and cross-feed screw 28, is a shaft 32, above shaft 22 and at one side of shaft 15; the shaft 15 and this shaft 32 preferably being in a vertical plane with the cross-feed screw 28, and the shaft 32 being in a horizontal plane with the shaft 15.

This shaft 32 is the shifter shaft or rod, and has pinned on it the shiftable middle gear 33 which meshes with the wide-faced pinion 30 fixed on the shaft 22 which is connected with the feed rod 9 as above described. In front of the shiftable gear 33 the front outer gear member 34 is rotatable on the shifter shaft 32, and meshes with the pinion 31 on the cross-feed screw 28. In back of the shiftable gear 33 the rear outer gear member 35 is rotatable on the shifter shaft 32 and meshes with the gear 16 on the shaft 15 with the pinion 14 that meshes with the rack 13 as above described. As rapid rotation of the cross-feed screw 28 is required, the front member 34 has its teeth on its periphery; but the rear member 35 is in the form of a disk on the front of the gear part, which is a pinion to drive the rack pinion 14 slowly by meshing with the large gear 16.

The front member 34 has on its rear side adjacent to the middle member 33 a complete circular series of teeth 36, and the rear member 35 has on its front side adjacent to the middle member 33 a like complete circular series of teeth 37. The middle shiftable member 33 has both on its front side and its rear side, diametrically opposite segmental series of teeth 38 and 39, respectively, shaped to mesh with the outer member teeth 36 or 37 respectively as the middle member is slid forwardly or rearwardly. The outer members 34 and 35 are held in axially spaced relation, out against the walls of casing 12, by pins 40 slidably extending through holes 41 in the middle member 33 parallel with the shaft 32; the spacing being sufficient for the middle member 33, in mid position, to have its teeth 38 and 39 free of the teeth 36 and 37 of the outer members. All of these teeth 36, 37, 38 and 39 preferably are of V-shape so that the members will clutch if the teeth do not register fully, by very slight rotation allowed by the clearance of the gear teeth; the clutching teeth being made small enough to allow this.

The shifter shaft 32 is enlarged from middle member 33 forwardly, and its front part fits a bore in a boss 42 on the front of casing 12, with an annular groove 43 over a lower transverse bore in the boss, lapping into the upper bore. An element 44 is oscillatable in the lower bore and has its sides grooved to form an upper tooth-like part 45 and a lower part 46 preserving its bearing in the bore and having a groove 47 across its bottom, entered by a pin 48 fixed in the bottom of the boss 42, to prevent axial displacement of the oscillatable element 44. The upper part 45 of this element meshes in the shaft groove 43, allowing the shaft 32 to rotate and sliding the shaft when the element 44 is oscillated. This element 44 has an enlargement 49 in one enlarged end part of the bore, with a circumferential series of sockets 50, 50a and 50b in its bottom, so spaced that a detent pin 51 sliding up and down in the bottom of the boss 42 enters middle socket 50 to hold middle rotary member 33 in mid position, and enters sockets 50a and 50b to hold member 33 in front or rear clutched position, respectively. Detent pin 51 is held up by spring 52, confined by plug 52', so as to slip into or out of the sockets as the element 44 is turned.

On its enlarged end element 44 has a fork straddling a handle lever 53 with a pivot 54 in the fork and a projection 55 back from the pivot next to the front of the casing 12. Extending forward from the front of casing 12 are two lugs 56 and 57, respectively above and below the plane in which the lever projection 55 swings on element 44 turned to mid position, and offset transversely along this plane in opposite directions from mid position of lever projection 55 such distance as to prevent turning of element 44 directly from one clutching position to another without swinging handle lever 53 on the element 44 from one side of its mid position to the other. This provides a safeguard against forcing the device too far when it is desired to throw out one or the other clutch to neutral position in which neither the rack feed nor the cross feed is driven. The handle lever has on its side next to the crotch of the fork, notches 58 and 58a, so spaced that the detent pin 59, pressed out from the crotch of the fork by spring 60, will slip into one or the other notch as the lever is swung to one side or the other of its mid position, and when in the respective notch will hold the lever in position.

The shifter shaft 32 has an extension to the rear of the apron 8, with an annular groove 62. A lever 63 is fulcrumed on a pivot 64 in a ledge 65 on the back of the apron, and has one end 63a engaging in the groove 62, to move the lever 63 with the shaft but allow the shaft to turn. In the top of the nut member 23 is a T-slot with its end open and receiving the other end part 63b of the lever 63. The parts are so arranged that when member 23 is down in mesh with lead screw 10 and lever 63 is in its mid position, lever end part 63b is in the narrow top entrance portion 66 of the T-slot, and prevented from swinging, so that middle member 33 cannot be shifted either way for clutching; but when member 23 is up out of mesh, lever end part 63b is in the horizontal plane of lower lateral parts 67 and 68 of the T-slot, and can swing either way for shifting middle member 33 into either clutching position, and when so swung will prevent sliding of member 23 down into mesh, as the top of slot portion 67 or 68 will engage with the top of the lever end part 63b.

In the shifting mechanism the two outer members might be shifted, as a unit, with the middle member, as the other unit, held from shifting, and the operative connections might be other than spur gears, and other kinds of manipulating means or means for holding the member or members in shifted position might be provided, as well as other means for preventing simultaneous connection of the lead screw and the feeding mechanisms.

Any or all of the above modifications, or other modifications, may occur, either in the shifting or the relieving mechanisms, and while I have specifically illustrated and described a preferred example, I do not wish to be understood as being limited thereto, but what I claim as new and desire to secure by Letters Patent is:

1. In a lathe comprising a carriage, a lead screw, an element shiftable on the carriage to connect or disconnect the lead screw and carriage, feed-rod-connecting, carriage-feeding and cross-feeding mechanisms on said carriage, three members coaxially and severally rotatable on said carriage with clutching means on their adjacent sides, the middle member being connected to the feed-rod-connecting mechanism and the outer two members being connected, respectively, to the other two mechanisms and being held in axially spaced relation as a unit distinct from the middle member as a second unit, and one of said units being axially shiftable to selectively clutch together either outer member and the middle member, and means shifted with said shiftable unit, preventing shifting of said element to connect the lead screw and carriage except when said shiftable unit is in its mid position, and preventing shifting of said shiftable unit from said mid-position when said element is in lead-screw-connecting position.

2. In combination with a support and three mechanisms on the support, three members severally and coaxially rotatable on the support and connected, respectively, to the three mechanisms, the two outer members being held in axially spaced relation as a unit distinct from the middle member as a second unit, the three members having positively engaging clutching means on their adjacent sides, and one unit being shiftable axially to three different positions to selectively clutch the middle member and either outer member together, and lever means directly operative on the shiftable unit to set it in any of said positions, and having detent means to hold said unit in each position.

3. In combination with a support and three mechanisms on the support, three members severally rotatable, a shaft on said support, supporting said members in coaxial relation, said members having positively engaging clutching means on their adjacent sides and the two outer members being held in axially spaced relation as a unit distinct from the middle member as a second unit, said shaft and one of said units being shiftable axially to three different positions to clutch either outer member and the middle member together, selectively, and lever means operable directly on said shaft to shift said shiftable unit, the three members being connected, respectively, to the three mechanisms, and said lever means having detent means to hold said shaft and shiftable unit in each position.

4. In a machine comprising a support and a member to be moved in either direction from a mid position and to be held in mid position or in either position to which it is moved therefrom, on said support, an element oscillatable on said support on an axis at right angles to the line of movement of said member, operatively engaging said element to move it in either direction by oscillation from a mid position, a handle swinging on said element with a projection at an angle to the element axis, said support having surfaces so spaced in the direction of swing of said projection when the element is oscillated, and so offset from each other in the direction of swing of the projection on the element, that they prevent oscillation of the element directly from one side of mid position to the other side thereof, but permit oscillation of the element in one direction to mid position if the handle is swung in one direction on the element, and permit oscillation of the element in the other direction to mid position if the handle is swung in the opposite direction on the element.

5. In a construction as set forth in claim 4, detent means on the oscillatable element, holding the handle in either position to which the handle is swung to permit the oscillation of said element.

6. In a construction as set forth in claim 4, detent means on the support, holding the oscillatable element in mid position wherein it holds the member in mid position, and detent means on said oscillatable element, holding the handle in either position to which the handle is swung to permit the oscillation of said element, said detent means for the oscillatable element also being adapted to hold said element in either position to which it is moved from mid position as permitted by the swinging of said handle from one side of its mid position on the element to the other side thereof.

7. In combination with a lathe apron having a front wall with a forwardly projecting boss and a front-to-rear bore and a transverse bore extending through and meeting in said boss, a shiftable transmission member in said apron, a shaft fixed to said member and slidable in said front-to-rear bore, with an annular groove meeting said transverse bore, an element oscillatable in said transverse bore and having a part meshing in said annular groove, said element having a portion extending out at one side of said boss, and handle means on said portion for oscillating said element.

8. A combination as set forth in claim 7, in which said handle means is pivoted to swing on the mentioned portion of the element, with a projection swinging therewith adjacent to the front of the apron, said front having lugs offset to opposite sides of a path of swinging of said projection with the element when swung to mid position on said element, but one or the other lug obstructing swinging of said projection with said element when said handle means is swung to one or the other side of mid position.

9. A combination as set forth in claim 7, in which the lathe apron has a shiftable connection for operation alternatively with said shiftable transmission member, and in which the slidable shaft has an extension to the rear of the apron with a second annular groove therein, and including obstructing means engaging in said second annular groove and obstructing shifting of said connection when the shiftable transmission member is in its operative position.

10. A combination as set forth in claim 7, in which the shiftable transmission member is disc-shaped with V-shaped axially extended teeth on its side, and in which there is a second member with like shaped teeth with which the teeth of the first member mesh when said first member is shifted, and in which the oscillatable element has a series of sockets, and in which a detent pin is spring-pressed in the boss to enter one or another socket to hold said first member in or out of mesh with the second member.

WILLIAM F. GROENE.